United States Patent
Ono et al.

(10) Patent No.: US 12,099,896 B2
(45) Date of Patent: Sep. 24, 2024

(54) IMAGE READING APPARATUS, IMAGE READING METHOD, AND NON-TRANSITORY RECORDING MEDIUM

(71) Applicants: Hirofumi Ono, Kanagawa (JP); Shinji Sakaguchi, Kanagawa (JP); Ayumu Hashimoto, Kanagawa (JP)

(72) Inventors: Hirofumi Ono, Kanagawa (JP); Shinji Sakaguchi, Kanagawa (JP); Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/119,313

(22) Filed: Mar. 9, 2023

(65) Prior Publication Data

US 2023/0297796 A1    Sep. 21, 2023

(30) Foreign Application Priority Data

Mar. 17, 2022 (JP) ................................ 2022-042414
Nov. 29, 2022 (JP) ................................ 2022-190830

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01); *G06K 19/06103* (2013.01)

(58) Field of Classification Search
CPC ........................ G06K 7/1417; G06K 19/06037
USPC ........................................................ 235/462.1
See application file for complete search history.

(56) References Cited

U.S. PATENT DOCUMENTS

| | | | |
|---|---|---|---|
| 10,397,497 B1* | 8/2019 | Graves | H04N 23/11 |
| 2013/0241884 A1* | 9/2013 | Kao | G06F 3/0421 |
| | | | 345/175 |
| 2014/0376808 A1 | 12/2014 | Hashimoto | |
| 2020/0120314 A1* | 4/2020 | Yoshizaki | H04N 23/11 |
| 2020/0336615 A1 | 10/2020 | Ono et al. | |
| 2021/0377396 A1* | 12/2021 | Inukai | H04N 1/4097 |
| 2022/0109778 A1 | 4/2022 | Nambara et al. | |
| 2022/0141350 A1 | 5/2022 | Yokoyama et al. | |
| 2022/0279079 A1* | 9/2022 | Sakaguchi | H04N 1/00236 |
| 2024/0008740 A1* | 1/2024 | Alasirnio | A61B 3/1208 |

FOREIGN PATENT DOCUMENTS

| | | |
|---|---|---|
| JP | 2000-125075 | 4/2000 |
| JP | 2002-342746 | 11/2002 |
| JP | 2007-043427 | 2/2007 |

* cited by examiner

*Primary Examiner* — Allyson N Trail
(74) *Attorney, Agent, or Firm* — XSENSUS LLP (57) ABSTRACT

An image reading apparatus includes a first light source, a second light source, a visible imaging sensor, an invisible imaging sensor, and a reduction unit. The first light source irradiates an object with visible light. The second light source irradiates the object with invisible light. The visible imaging sensor reads a visible image of the object. The invisible imaging sensor reads an invisible image of the object. The reduction unit reduces a visible wavelength component of light received by the invisible imaging sensor.

11 Claims, 10 Drawing Sheets

IMAGE READING APPARATUS, IMAGE READING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-042414, filed on Mar. 17, 2022 and 2922-190830, filed on Nov. 29, 2022, in the Japan Patent Office, the entire disclosure of which is hereby incorporated by reference herein.

BACKGROUND

Technical Field

Embodiments of this disclosure relate to an image reading apparatus, an image reading method, and a non-transitory recording medium.

Related Art

There is a technique used in an image reading apparatus that irradiates a document with the light of a lamp including a visible wavelength component and an infrared (IR) wavelength component, receives reflected light from the document, performs photoelectric conversion on the received light, and outputs image data. According to the technique, with a plurality of visible wavelength component image sensors for detecting, in the reflected light from the document, a visible wavelength component including an IR wavelength component, an IR wavelength component image sensor for detecting an IR wavelength component in the reflected light from the document, and the IR wavelength component output from the IR wavelength component image sensor, an image formed with an IR wavelength component is extracted from a document image.

The above-described image reading apparatus, which irradiates the document with the light of the light source including the IR wavelength component, includes the image sensors for detecting the visible wavelength component and the image sensor for detecting the IR wavelength component. The IR wavelength component output from the IR wavelength component image sensor is removed from the visible wavelength component including the IR wavelength component, which is output from the visible wavelength component image sensors. Then, with the IR wavelength component output from the IR wavelength component image sensor, the characteristic image formed with the IR wavelength component is extracted from the document image.

There is also a technique of irradiating a document with ultraviolet (UV) light and visible light and identifying an image of the document as an invisible image or a visible image based on the difference between the reading result obtained by irradiating the image with the UV light alone and the reading result obtained by irradiating the image with the UV light and the visible light. It is difficult to distinguish between the invisible image and the visible image by the irradiation with the UV light alone.

SUMMARY

In one embodiment of this invention, there is provided an image reading apparatus that includes, for example, a first light source, a second light source, a visible imaging sensor, an invisible imaging sensor, and a reduction unit. The first light source irradiates an object with visible light. The second light source irradiates the object with invisible light. The visible imaging sensor reads a visible image of the object. The invisible imaging sensor reads an invisible image of the object. The reduction unit reduces a visible wavelength component of light received by the invisible imaging sensor.

In one embodiment of this invention, there is provided an image reading method that includes, for example, irradiating an object with visible light of a first light source, irradiating the object with invisible light of a second light source, reading a visible image of the object with a visible imaging sensor, reading an invisible image of the object with an invisible imaging sensor, and adjusting a light amount of the visible light of the first light source to reduce a visible wavelength component of light received with the invisible imaging sensor.

In one embodiment of this invention, there is provided a non-transitory recording medium storing a plurality of instructions which, when executed by one or more processors; causes the processors to perform the above-described image reading method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 10-1A, 10-1B, and 10-1C are a diagram and graphs illustrating an operation of the image reading apparatus of the second embodiment, in which thickness of IR pass filters is changed;

FIG. 10-2 is a graph illustrating a specific example of the relationship between the thickness of the IR pass filters and the transmittance of visible light and invisible light in the image reading apparatus of the second embodiment;

FIG. 10-3 is a graph illustrating a specific example of the relationship between the thickness of the IR pass filters and the proportion of a visible wavelength component included in the invisible light in the image reading apparatus of the second embodiment;

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, an image reading apparatus, an image reading method, and a non-transitory recording medium according to embodiments of the present disclosure are described in detail below. As used herein, the singular forms "a," "an," and "the" are intended to include the plural forms as well, unless the context clearly indicates otherwise.

Figure 12:
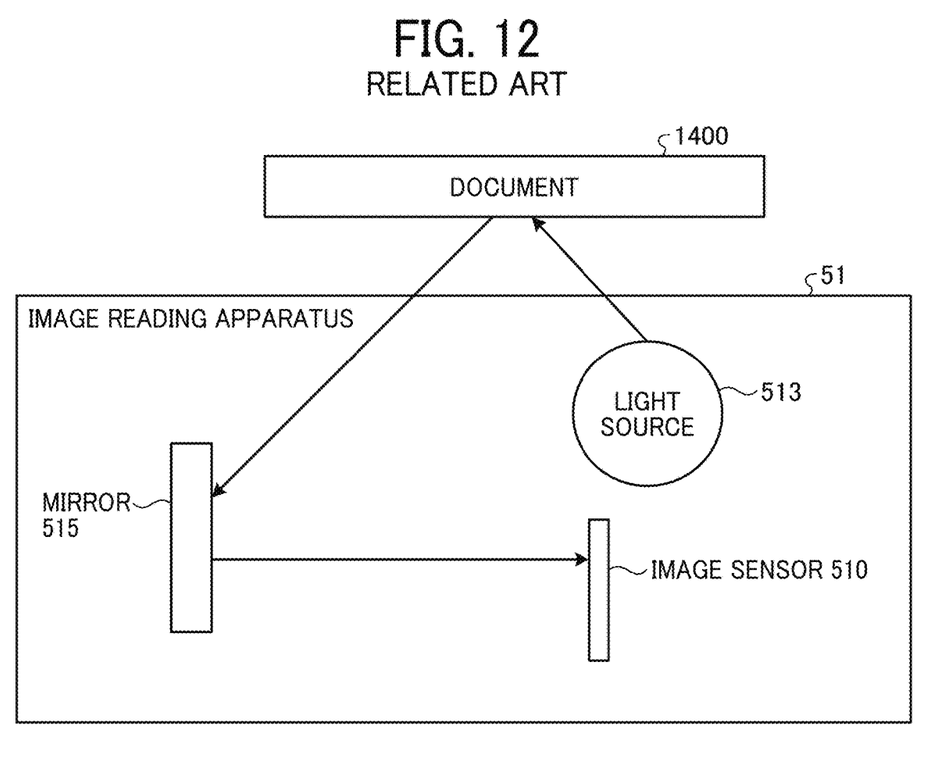
FIG. 12 is a diagram illustrating an exemplary configuration of an image reading apparatus according to related art.
Figure 13A:
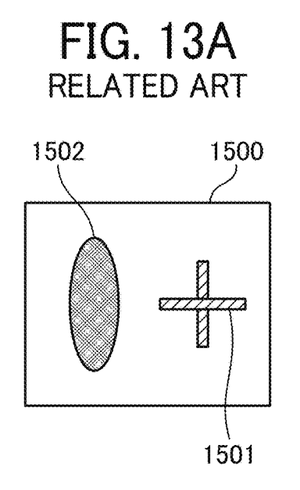
FIGS. 13A, 13B, and 13C are diagrams illustrating an issue of the image reading apparatus according to the related art.
Figure 13B:
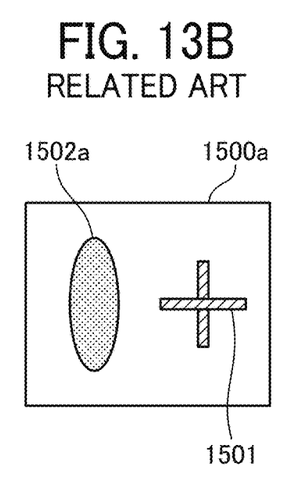
Figure 13C:
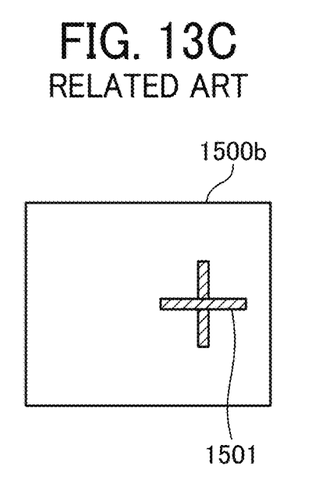

FIG. 12 is a diagram illustrating an exemplary configuration of an image reading apparatus according to related art. FIGS. 13A, 13B, and 13C are diagrams illustrating an issue of the image reading apparatus of the related art. A configuration and issue of the image reading apparatus of the related art will be described with reference to FIGS. 12 and FIGS. 13A to 13C.

An image reading apparatus 51 of the related art illustrated in FIG. 12 includes a light source 513, a mirror 515, and an image sensor 510, for example. The light source 513 emits light including an infrared (IR) wavelength component. The mirror 515 reflects the light emitted from the light source 513 and reflected by a document 1400. The image sensor 510 receives the light reflected by the mirror 515, performs photoelectric conversion on the received light, and outputs image data.

The image sensor 510 includes a visible wavelength component image sensor and an IR wavelength component image sensor. With an IR wavelength component output from the IR wavelength component image sensor, the image sensor 510 extracts an IR wavelength image from the document 1400 as an invisible image. Herein, the invisible image is an image that reflects invisible light and is recognizable through the detection of the thus-reflected invisible light. The visible image, on the other hand, is an image that reflects visible light and is recognizable through the detection of the thus-reflected visible light.

For example, as illustrated in FIG. 13A, a document 1500 with an invisible image 1501 and a visible image 1502 embedded therein is irradiated with the light of the light source 513 to read the invisible image 1501. The light of the light source 513 includes IR light and visible light. In this case, if the IR wavelength component image sensor of the image sensor 510 is completely insensitive to a visible wavelength component, a read document image 1500b including the invisible image 1501 alone is obtained, as illustrated in FIG. 13C. If the IR wavelength component image sensor of the image sensor 510 has an insufficient light blocking rate against the visible wavelength component, however, a read document image 1500a including a visible image 1502a as well as the invisible image 1501 is detected, as illustrated in FIG. 13B.

Figure 14A:
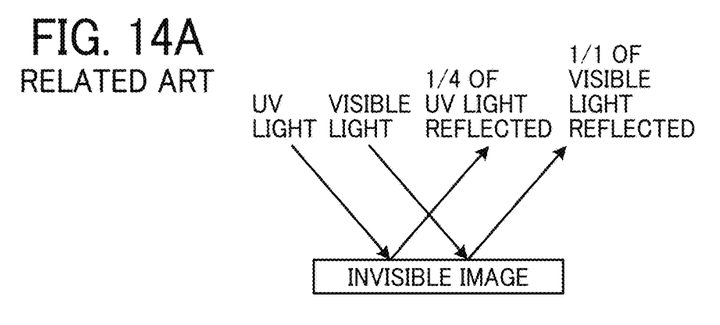
FIGS. 14A, 14B, and 14C are diagrams illustrating an exemplary configuration of an image reading apparatus according to another related art.
Figure 14B:
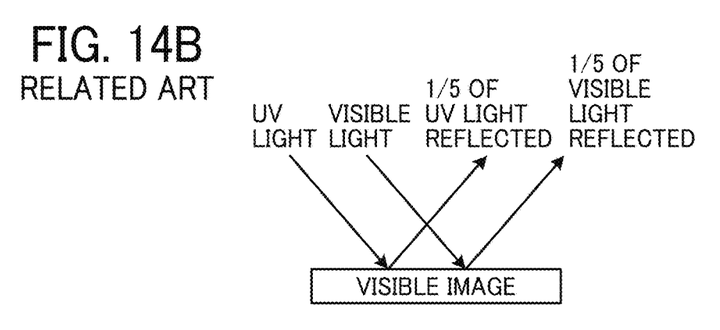
Figure 14C:
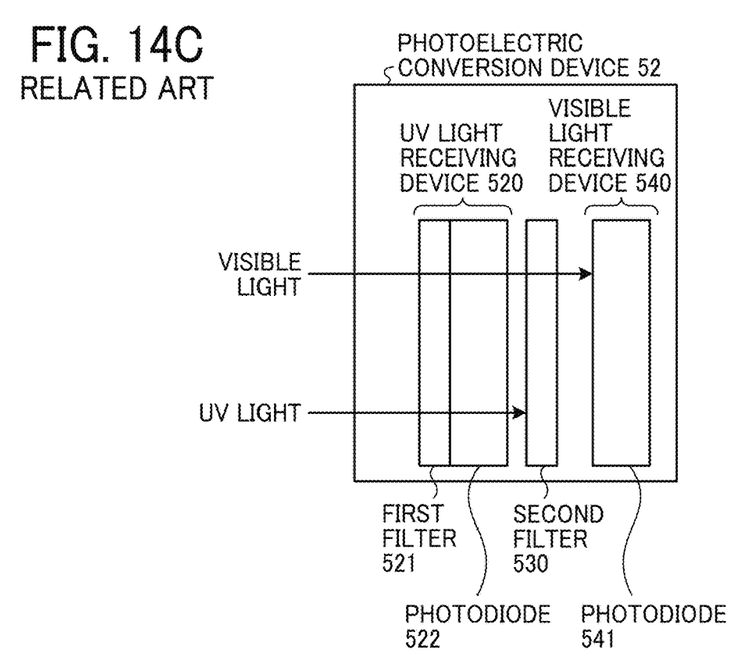

FIGS. 14A, 14B, and 14C are diagrams illustrating an exemplary configuration of an image reading apparatus according to another related art. A configuration and operation of the image reading apparatus of the related art will be described with reference to FIGS. 14A to 14C.

The image reading apparatus of the related art includes a recording and reading device that prevents information from being visualized by ultraviolet (U light irradiation and detects invisible information in a place with light. The image reading apparatus includes a visible light source, a UV light source, and a photoelectric conversion device, for example. The visible light source emits visible light. The UV light source emits UV light. A document is irradiated with the visible light of the visible light source and the UV light of the UV light source. The photoelectric conversion device receives the visible light and the UV light (i.e., invisible light) reflected by the document, performs photoelectric conversion on the visible light and the UV light, and outputs an invisible image. The thus-configured image reading apparatus aims to extract an invisible image in a UV wavelength range from the document.

The image reading apparatus with the above-described configuration irradiates an invisible image and a visible image included in the document with the UV light and the visible light in a place with light, to thereby read invisible information from the document. The light amount of the UV light reflected by the invisible image included in the document is approximately a quarter of that of the emitted UV light, as illustrated in FIG. 14A. Further, the light amount of the UV light reflected by the visible image included in the document is approximately one fifth of that of the emitted UV light, as illustrated in FIG. 14B. The light amount of the visible light reflected by the invisible image included in the document, on the other hand, is approximately the same as that of the emitted visible light, as illustrated in FIG. 14A. Further, the light amount of the visible light reflected by the visible image included in the document is approximately one fifth of that of the emitted visible light, as illustrated in FIG. 14B. Therefore, while it is difficult to read the invisible image with the UV light irradiation alone, the invisible image and the visible image are distinguished from each other with the visible light irradiation based on the difference in the reflected light amount between the visible light and the UV light.

The above-described image reading apparatus includes a photoelectric conversion device 52 illustrated in FIG. 14C. As illustrated in FIG. 14C, the photoelectric conversion device 52 includes an UV light receiving device 520 and a visible light receiving device 540 stacked with a second filter 530 disposed therebetween such that incident light is first received by the UV light receiving device 520.

The UV light receiving device 520 is sensitive to the UV wavelength component alone. The UV light receiving device 520 includes a first filter 521 and a photodiode 522. The first filter 521 transmits the visible wavelength component. The photodiode 522 detects the light transmitted through the first filter 521. The visible light receiving device 540 is a typical light receiving device such as a silicon photodiode. The second filter 530 is a filter that absorbs the UV wavelength component and transmits the visible wavelength component.

The image reading apparatus including the photoelectric conversion device 52 illustrated in FIG. 14C adjusts the respective light amounts of the UV light and the visible light to reduce the influence of ambient light. This adjustment of the light amounts aims to change the ratio between the ambient light and the light of the light sources emitted to and reflected by the document in the incident light received by the photoelectric conversion device 52. That is, the adjustment of the light amounts is executed to reduce the ratio of the ambient light incident on the photoelectric conversion device 52, and not to adjust the light amount of the visible light incident on the photoelectric conversion device 52 to reduce the visible wavelength component included in the invisible image. According to this light amount adjustment method, therefore, the ratio between the invisible light amount and the visible light amount may change depending on the conditions of the ambient light, increasing the visible light amount. Consequently, as well as the invisible image, the visible image may also be detected in the read document image, as illustrated in the above-described example of FIG. 13B, which may affect the recognition of the invisible image, causing a failure to read a barcode, for example.

In the following embodiments of the present application, a detailed description will be given of configurations and operations for reducing the influence of the visible wavelength component on the image recognition in the reading of the invisible image with the invisible light and visible light irradiation.

A First Embodiment of the Present Invention Will be Described

Figure 1:
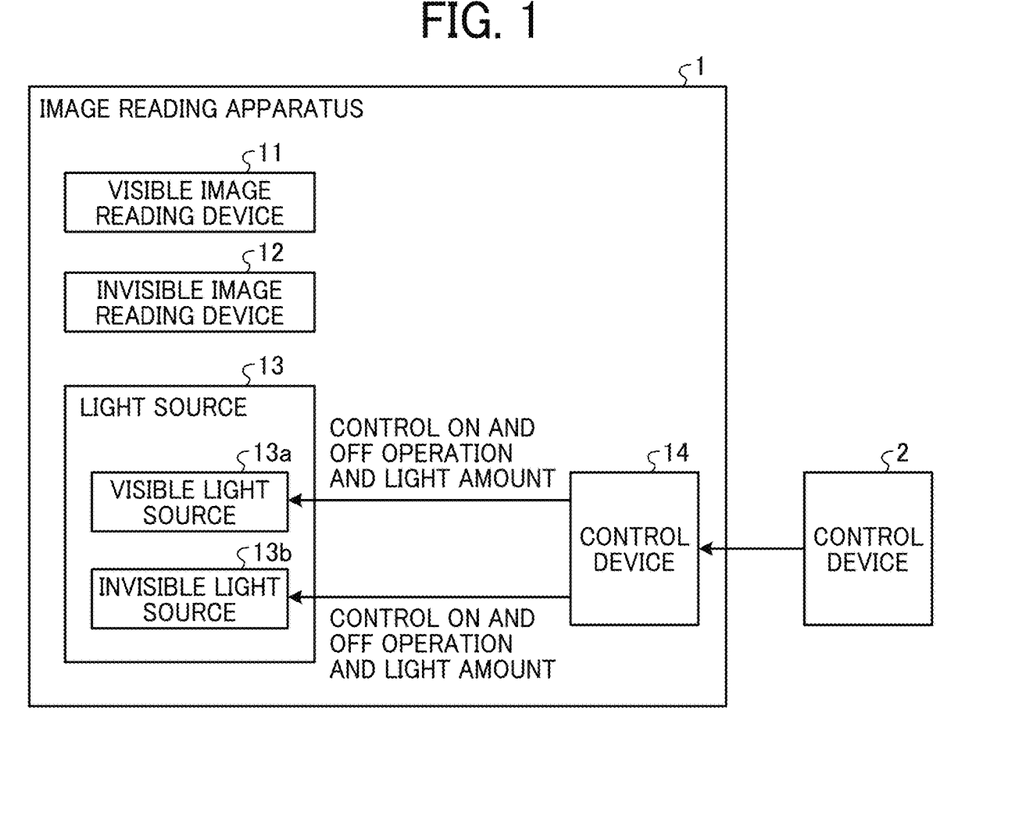
FIG. 1 is a diagram illustrating an exemplary configuration of an image reading apparatus according to a first embodiment of the present invention.
Figures 1A, 10:
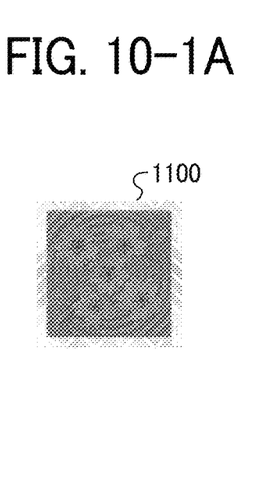
Figures 1B, 10:
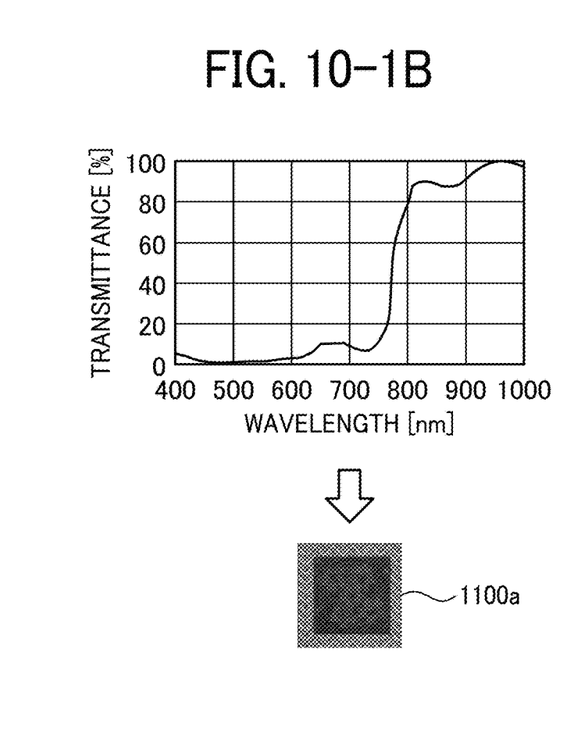
Figures 1C, 10:
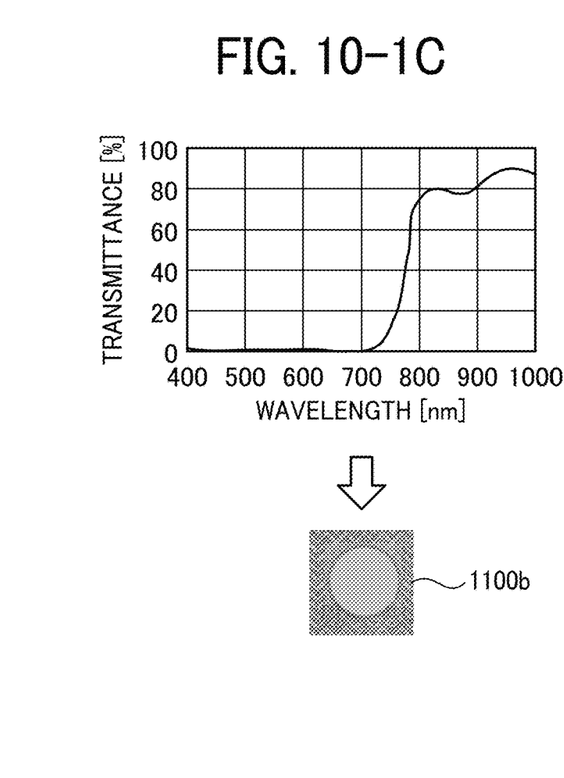
Figure 2A:
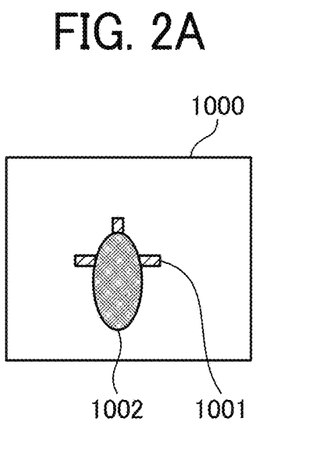
FIGS. 2A, 2B, and 2C are diagrams illustrating an operation of the image reading apparatus of the first embodiment.
Figure 2B:
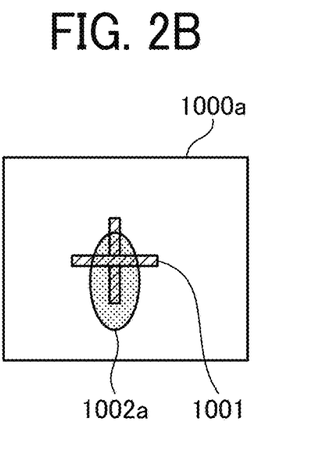
Figure 2C:
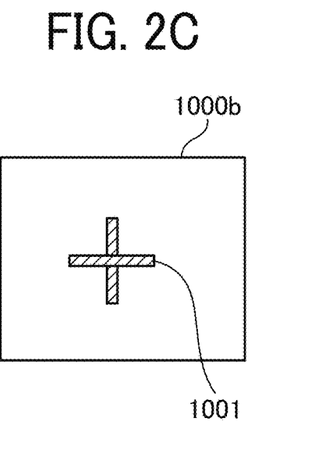

FIG. 1 is a diagram illustrating an exemplary configuration of an image reading apparatus of the first embodiment. FIGS. 2A, 2B, and 2C are diagrams illustrating an operation of the image reading apparatus of the first embodiment. A configuration and operation of an image reading apparatus 1 of the first embodiment will be described with reference to FIG. 1 and FIGS. 2A to 2C.

As illustrated in FIG. 1, the image reading apparatus 1 includes a visible image reading device 11 (a visible imaging sensor), an invisible image reading device 12 (an invisible imaging sensor), a light source 13, and a control device 14.

The light source 13 includes a visible light source 13a (a first light source) and an invisible light source 13b (a second light source). The visible light source 13a, emits visible light. The invisible light source 13b emits invisible light such as IR light or UV light. The light source 13 is not necessarily required to be implemented by separate light sources, i.e., the visible light source 13a and the invisible light source 13b, and may be implemented by a single light source that emits light including visible light and invisible light.

The visible image reading device 11 is a reading device that receives the light emitted from the light source 13 and reflected by a document, performs photoelectric conversion on the visible light included in the received light, and outputs an image. The visible image reading device 11 is an image sensor, for example.

The invisible image reading device 12 is a reading device that receives the light emitted from the light source 13 and reflected by the document, performs photoelectric conversion mainly on the invisible light included in the received light, and outputs an image. The invisible image reading device 12 is an image sensor, for example.

The control device 14 is a controller that controls on and off operations and the light amounts of the visible light source 13a, and the invisible light source 13b in accordance with control commands from an external control device 2. The control device 14 is implemented by a central processing unit (CPU) or an application specific integrated circuit (ASIC), for example.

The control device 2 is an external device that controls the operation of the control device 14. The control device 2 includes an arithmetic device such as a CPU.

The above-described image reading apparatus 1 of the first embodiment is assumed to simultaneously read a visible image and an invisible image by simultaneously emitting the light from the visible light source 13a and the invisible light source 13b. That is, the image reading apparatus 1 extracts, from a document 1000 with an invisible image 1001 and a visible image 1002 embedded therein, as illustrated in FIG. 2A, a read image of the invisible image 1001 and a read image of the visible image 1002. For example, the image reading apparatus 1 is applicable to simultaneous reading of visible information included in a document such as a certificate of residence and an invisible authenticity verification mark embedded in the document to verify the authenticity of the document. Thereby, the time taken to confirm user authenticity is reduced.

In the process of the invisible image reading device 12 to obtain the invisible image from the document 1000 in FIG. 2A, if the visible wavelength component of the light received by the invisible image reading device 12 is not reduced, a visible image 1002a is included in a read document image 1000a, as illustrated in FIG. 2B. The visible image 1002a, which is formed based on the visible wavelength component forming part of the received light, prevents the identification of the embedded invisible image 1001. In the image reading apparatus 1 of the first embodiment, therefore, the control device 14 (an example of a reduction unit) adjusts the light amount of the visible light of the visible light source 13a to reduce the visible wavelength component of the light received by the invisible image reading device 12. The invisible image reading device 12 thereby obtains a read document image 1000b including the invisible image 1001 alone, as illustrated in FIG. 2C. Herein, the visible wavelength component refers to a component in a wavelength range of 380 nanometers (nm) to 780 nm, for example.

Figure 3A:
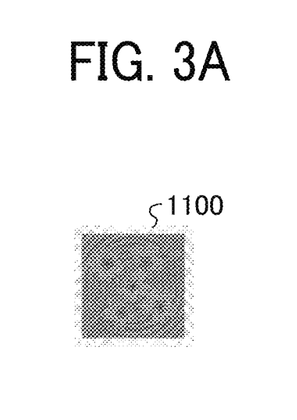
FIGS. 3A, 3B, and 3C are diagrams illustrating an operation of the image reading apparatus of the first embodiment, in which the light amount of visible light is adjusted.
Figure 3B:
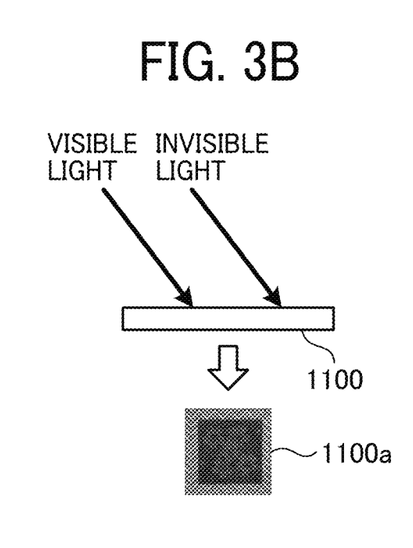
Figure 3C:
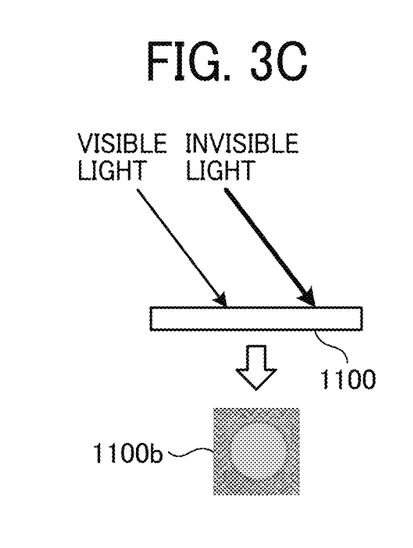
Figure 4A:
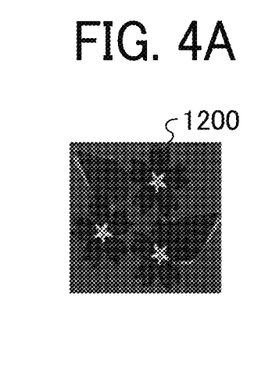
FIGS. 4A, 4B, and 4C are diagrams illustrating the reading of a document with a quick response (QR) code® performed by the image reading apparatus of the first embodiment.
Figure 4B:
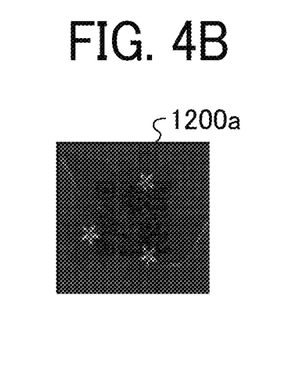
Figure 4C:
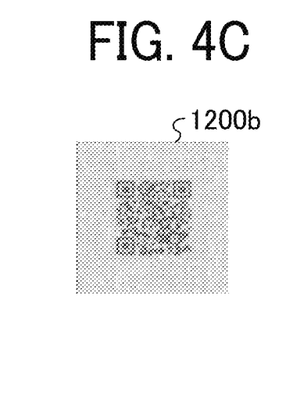

FIGS. 3A, 3B and 3C are diagrams illustrating an operation of the image reading apparatus 1 of the first embodiment, in which the light amount of the visible light is adjusted. FIGS. 4A, 4B, and 4C are diagrams illustrating the reading of a document with a quick response (QR) code®. An operation of adjusting the light amount of the visible light in the image reading apparatus 1 of the first embodiment will be described with reference to FIGS. 3A to 3C and FIGS. 4A to 4C.

It is assumed here that an object read by the image reading apparatus 1 is a document 1100 with an embedded character embedded therein as the invisible image, as illustrated in FIG. 3A. For example, if the document 1100 is irradiated with the visible light of the visible light source 13a and the invisible light of the invisible light source 13b with the respective maximum light amounts without adjustment in light amount, a read document image 1100a is read by the invisible image reading device 12, as illustrated in FIG. 3B. The read document image 1100a includes a visible image (the image of cherry blossoms in the present example), which prevents the identification of the embedded character (a Chinese character meaning "authentic" in the present example) as the invisible image.

The control device 14 of the image reading apparatus 1 therefore adjusts the light amount of the visible light to be emitted from the visible light source 13a, as illustrated in FIG. 3C, to reduce the visible wavelength component of the light received by the invisible image reading device 12. Specifically, for example, the control device 14 adjusts the light amount of the visible light to be emitted from the visible light source 13a to be less than the light amount of the invisible light emitted from the invisible light source 13b or less than the maximum light amount. Thereby, the invisible image reading device 12 reads a read document image 1100b illustrated in FIG. 3C, in which the embedded character as the invisible image based on the invisible wavelength component is identifiable.

Reducing the light amount of the visible light emitted from the visible light source 13a, however, increases the ratio of noise such as optical shot noise from the invisible light source 13b to the visible light received by the visible image reading device 11, which may degrade the quality of the visible image. It is therefore desirable that the light amount of the visible light of the visible light source 13a be adjusted to the minimum possible extent to maintain the quality of the visible image.

For example, if the document read by the image reading apparatus 1 is the above-described document 1100 of FIG. 3A with the embedded character (the Chinese character meaning "authentic") embedded therein as the invisible image, the control device 14 may adjust the light amount of the visible light to be emitted from the visible light source 13a to enable the invisible image reading device 12 to read the read document image 1100b, in which the embedded character as the invisible image is visually recognizable. As an example of the method of adjusting the light amount of the visible light to be emitted from the visible light source 13a, the control device 14 may adjust the output level (the current or voltage value) of a control signal for turning on the visible light source 13a.

It is assumed here that the object read by the image reading apparatus 1 is a document 1200 with a two-dimensional code such as a QR code embedded therein as the invisible image, as illustrated in FIG. 4A. For example, if the document 1200 is irradiated with the visible light of the visible light source 13a and the invisible light of the invisible light source 13b with the respective maximum light amounts without adjustment in light amount, a read document image 1200a is read by the invisible image reading device 12, as illustrated in FIG. 4B. The read document image 1200a includes a visible image (the image of cherry blossoms), which prevents the decoding of the two-dimensional code as the invisible image. Therefore, the control device 14 may adjust the light amount of the visible light to be emitted from the visible light source 13a to enable the invisible image reading device 12 to read a read document image 1200b, in which the two-dimensional code as the invisible image is decodable, as illustrated in FIG. 4C.

As described above, in the image reading apparatus 1 of the first embodiment, the visible light source 13a emits the visible light, and the invisible light source 13b emits the invisible light. Further, the visible image reading device 11 reads the visible image of the document, and the invisible image reading device 12 reads the invisible image of the document. The control device 14 adjusts the light amount of the visible light of the visible light source 13a to reduce the visible wavelength component of the light received by the invisible image reading device 12. In the reading of the invisible image with the invisible light and visible light irradiation, therefore, the influence of the visible wavelength component on the image recognition is reduced.

A First Modified Example of the First Embodiment Will be Described

Figure 5:
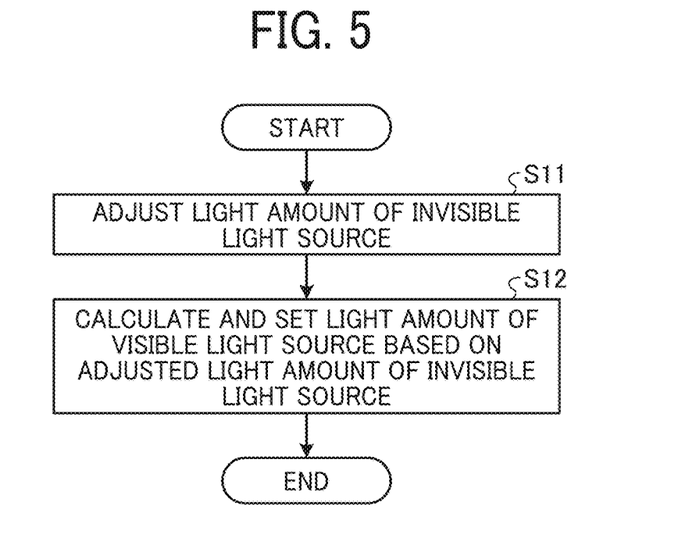
FIG. 5 is a flowchart illustrating an exemplary procedure of a light amount adjustment process of the image reading apparatus according to a first modified example of the first embodiment.

FIG. 5 is a flowchart illustrating an exemplary procedure of a light amount adjustment process of the image reading apparatus 1 according to the first modified example of the first embodiment. The procedure of the light amount adjustment process of the image reading apparatus 1 according to the first modified example will be described with reference to FIG. 5.

At step S11, the control device 14 of the image reading apparatus 1 adjusts the light amount of the invisible light to be emitted from the invisible light source 13b, and proceeds to step S12.

At step S12, based on the adjusted light amount of the invisible light of the invisible light source 13b, the control device 14 adjusts the light amount of the visible light to be emitted from the visible light source 13a to the level at which the visible wavelength component included in the read document image read by the invisible image reading device 12 does not affect the recognition of the invisible image. Then, the light amount adjustment process is completed.

The above-described light amount adjustment process prevents the light amount of the visible light of the visible light source 13a from being reduced more than necessary, contributing as much as possible to the maintenance of the quality of the visible image.

A Second Modified Example of the First Embodiment Will be Described

Figure 6:
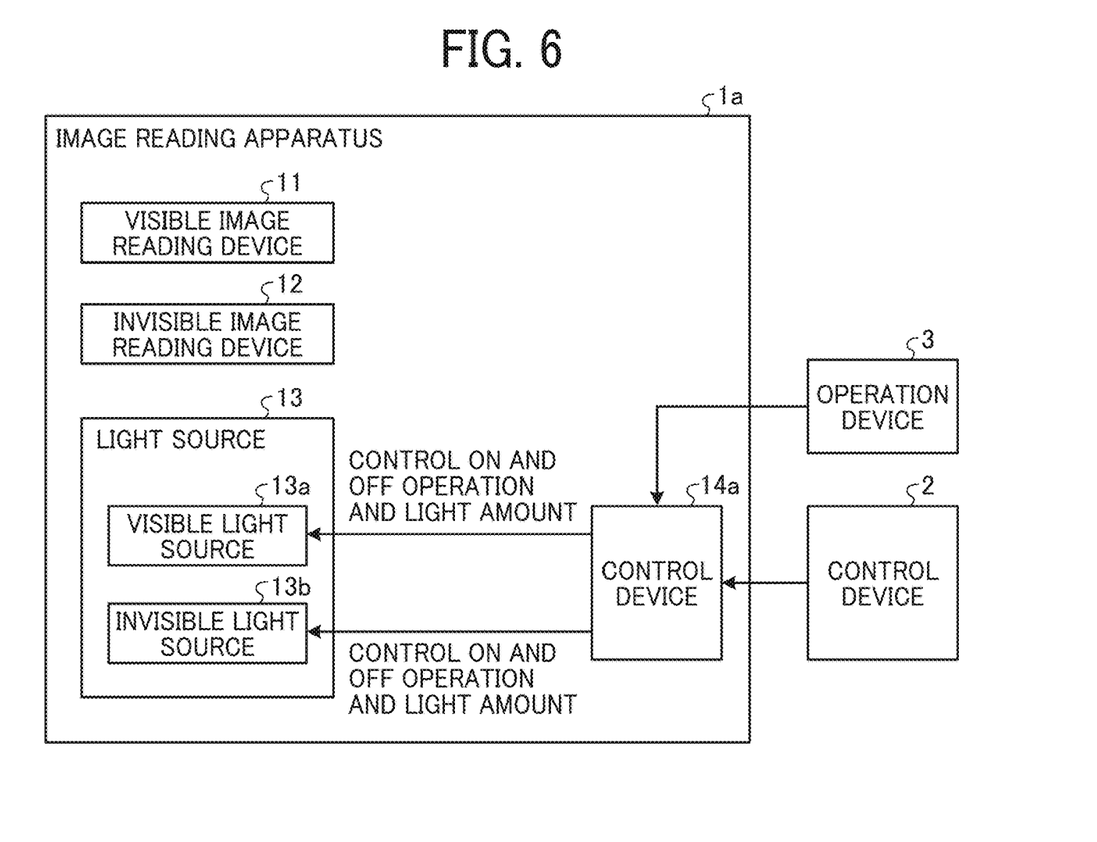
FIG. 6 is a diagram illustrating an exemplary configuration of an image reading apparatus according to a second modified example of the first embodiment.

FIG. 6 is a diagram illustrating an exemplary configuration of an image reading apparatus according to the second modified example of the first embodiment. A configuration and operation of an image reading apparatus 1a of the second modified example will be described with reference to FIG. 6.

As illustrated in FIG. 6, the image reading apparatus 1a includes the visible image reading device 11, the invisible image reading device 12, the light source 13, and a control device 14a. The functions of the visible image reading device 11, the invisible image reading device 12, and the light source 13 are as described above in the first embodiment.

The control device 14a is a controller that controls the on and off operations and the light amounts of the visible light source 13a and the invisible light source 13b in accordance with control commands from the external control device 2. The control device 14a also gradually adjusts the light amount of the visible light of the visible light source 13a in accordance with an operation performed on an operation device 3 by a user.

The operation device 3 is an operation input device, such as a touch panel, connected to the image reading apparatus 1a via a particular interface (I/F), for example. The operation device 3 transmits operation information input by the user to the control device 14a via the I/F. The above-described I/F may be connected to a wired cable, or may be a wireless I/F enabling wireless communication.

The acceptable level of the visible wavelength component in the invisible image may vary depending on the user. With the operation device 3, therefore, the light amount of the visible light of the visible light source 13a is gradually adjusted to the level desired by the user.

A Third Modified Example of the First Embodiment Will be Described

Figure 7:
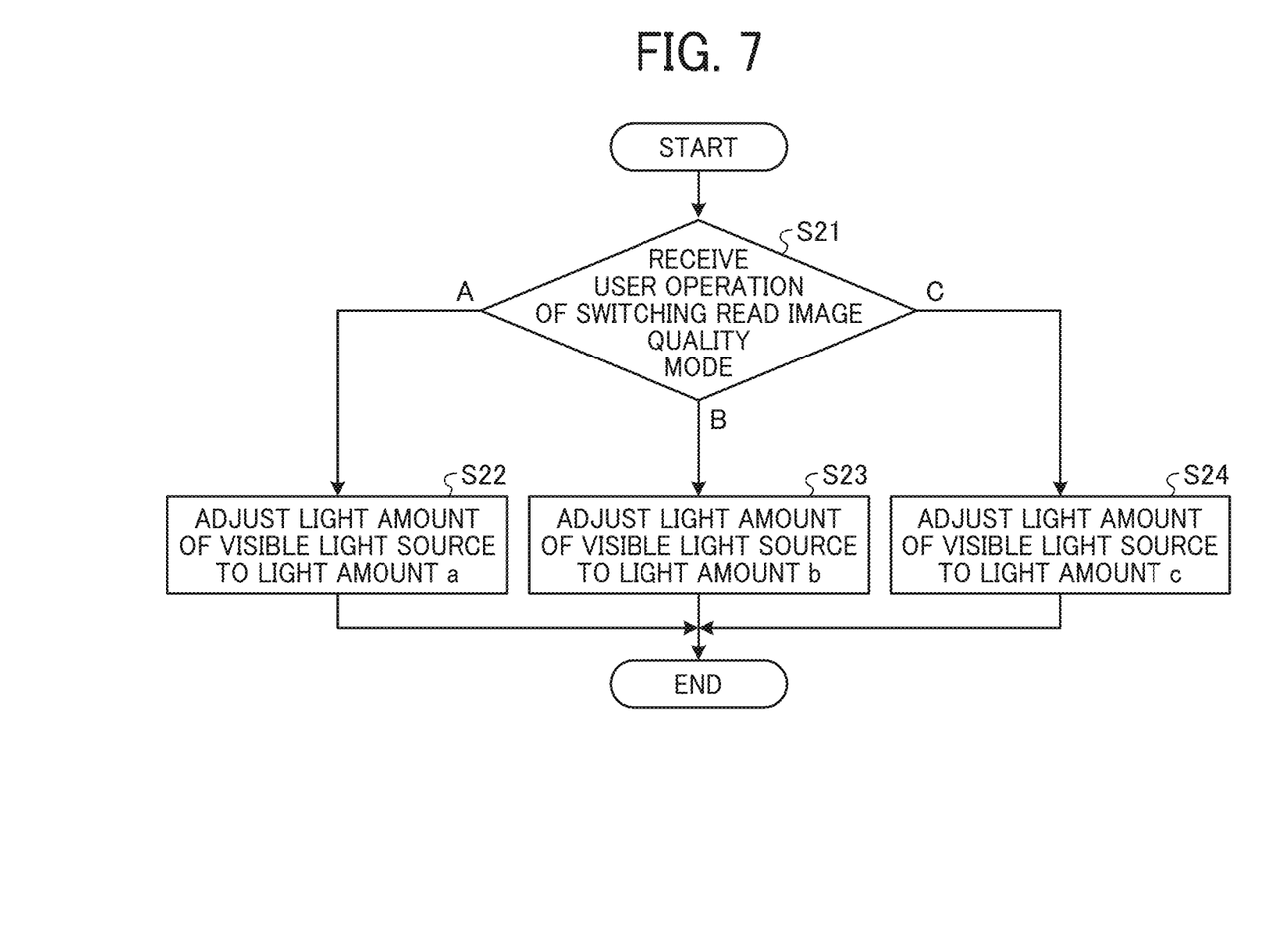
FIG. 7 is a flowchart illustrating an exemplary procedure of a mode switching operation of the image reading apparatus according to a third modified example of the first embodiment.

FIG. 7 is a flowchart illustrating an exemplary procedure of a mode switching operation of the image reading apparatus 1a according to the third modified example of the first embodiment. The mode switching operation of the image reading apparatus 1a of the third modified example will be described with reference to FIG. 7. The configuration of the image reading apparatus 1a of the third modified example is similar to the above-described configuration of the second modified example.

The control device 14a of the image reading apparatus 1a of the third modified example adjusts the light amount of the visible light of the visible light source 13a to obtain the light amount according to a read image quality mode selected by the user via the operation device 3 from a plurality of read image quality modes for the invisible image of the document to be read. For example, the plurality of read image quality modes include a read image quality mode for adjusting the light amount of the visible light of the visible light source 13a to be suitable for reading the invisible image of the document including a two-dimensional code such as a QR code and a read image quality mode for adjusting the light amount of the visible light of the visible light source 13a to be suitable for reading the invisible image of the document including an embedded character.

A procedure of the mode switching operation of the image reading apparatus 1a will be described below. It is assumed in the following description of FIG. 7 that there are three read image quality modes, but the number of read image quality modes is not limited to three.

At step S21, the user switches to one of read image quality modes A, B, and C of the control device 14a via the operation device 3. If the user switches to the read image quality mode A (A at step S21), the procedure proceeds to step S22. If the user switches to the read image quality mode B (B at step S21), the procedure proceeds to step S23. If the user switches to the read image quality mode C (C at step S21), the procedure proceeds to step S24.

At step S22, the control device 14a adjusts the light amount of the visible light of the visible light source 13a to obtain a light amount a according to the read image quality mode A. Men, the mode switching operation is completed.

At step S23, the control device 14a adjusts the light amount of the visible light of the visible light source 13a to obtain a light amount b according to the read image quality mode B. Then, the mode switching operation is completed.

At step S24, the control device 14a adjusts the light amount of the visible light of the visible light source 13a to obtain a light amount c according to the read image quality mode C. Then, the mode switching operation is completed.

The above-described procedure allows the user to adjust the light amount of the visible light of the visible light source 13a to be suitable for the process of reading the invisible image of the document simply by performing the operation of switching the read image quality mode, thereby contributing to the improvement of usability.

A Second Embodiment of the Present Invention Will be Described

A description will be given of an image reading apparatus of the second embodiment, focusing on differences from the image reading apparatus 1 of the first embodiment. In the first embodiment, a description has been given of the operation of adjusting the light amount of the visible light to be emitted from the visible light source 13a to reduce the visible wavelength component of the light received by the invisible image reading device 12. In the second embodiment, a description will be given of an operation of adjusting the thickness of pass filters included in an invisible image reading device to reduce the visible wavelength component of the light received by the invisible image reading device.

Figure 8:
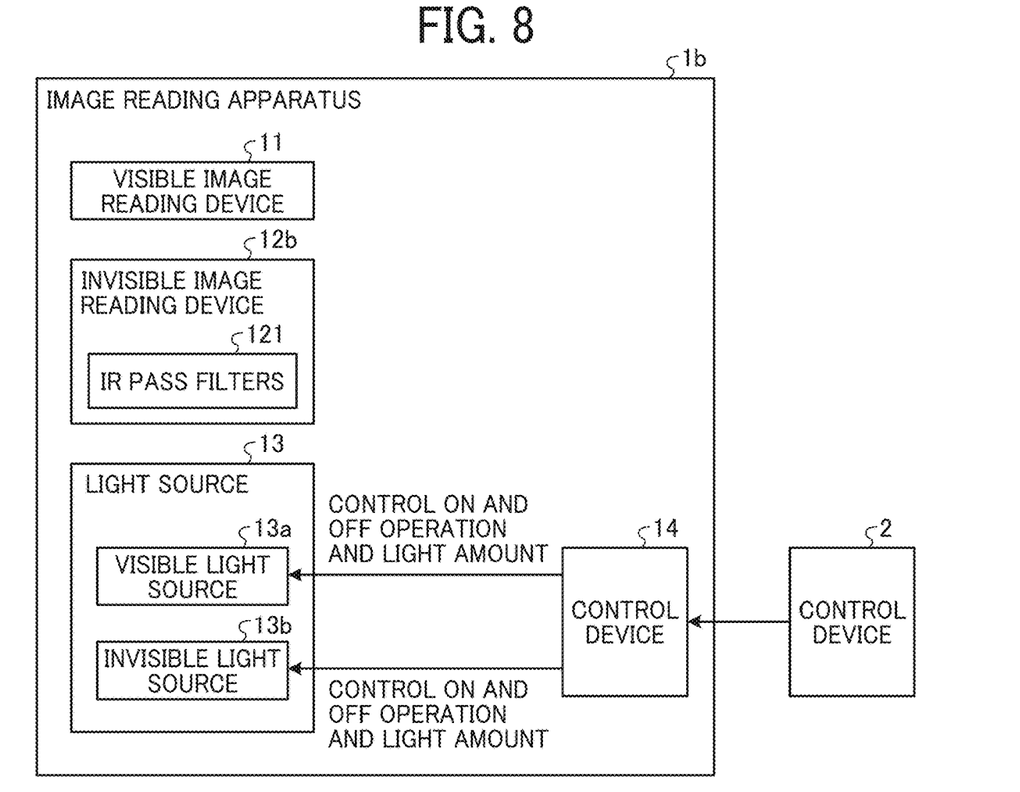
FIG. 8 is a diagram illustrating an exemplary configuration of an image reading apparatus according to a second embodiment of the present invention.
Figure 9A:
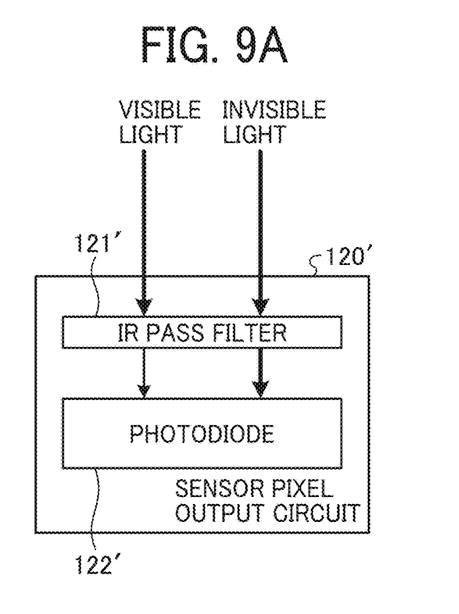
FIGS. 9A and 9B are diagrams illustrating an infrared (IR) pass filter of a sensor pixel output circuit included in the image reading apparatus of the second embodiment.
Figure 9B:
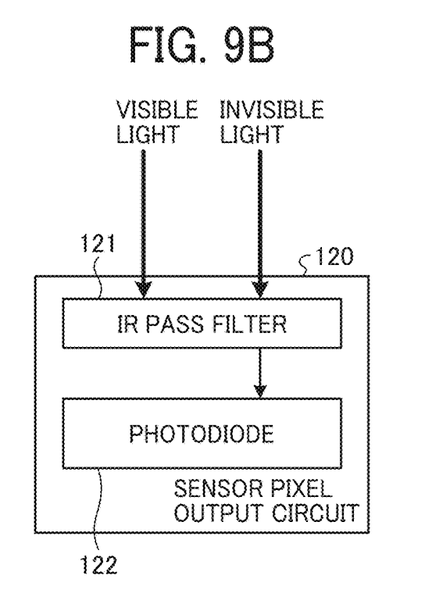

FIG. 8 is a diagram illustrating an exemplary configuration of an image reading apparatus of the second embodiment. FIGS. 9A and 9B are diagrams illustrating an IR pass filter of a sensor pixel output circuit in the image reading apparatus of the second embodiment. A configuration and operation of an image reading apparatus 1b of the second embodiment will be described with reference to FIG. 8 and FIGS. 9A and 9B.

As illustrated in FIG. 8, the image reading apparatus 1b includes the visible image reading device 11, an invisible image reading device 12b, the light source 13, and the control device 14. The functions of the visible image reading device 11 and the light source 13 are as described above in the first embodiment.

The invisible image reading device 12b is a reading device that receives the light emitted from the light source 13 and reflected by the document; performs photoelectric conversion mainly on the invisible light included in the received light, and outputs an image. The invisible image reading device 12b includes IR pass filters 121, as illustrated in FIG. 8. The IR pass filters 121 are filters aiming to transmit the invisible light such as IR light alone. However, the IR pass filters 121 also transmit part of the visible light incident thereon. Therefore, the thickness of the IR pass filters 121 is adjusted to reduce the amount of the visible light transmitted through the IR pass filters 121, as described later with FIGS. 9A and 9B.

The control device 14 is a controller that controls the on and off operations and the light amounts of the visible light source 13a and the invisible light source 13b in accordance with control commands from the external control device 2. In the second embodiment, the control device 14 does not adjust the light amount of the visible light of the visible light source 13a as in the first embodiment, but controls the light amount of the visible light source 13a and the light amount of the invisible light source 13b to be equal to each other, for example.

The adjustment of the thickness of the IR pass filters 121 will be described with reference to FIGS. 9A and 9B.

The invisible image reading device 12b includes a plurality of sensor pixel output circuits 120 illustrated in FIG. 9B. As illustrated in FIG. 9B, each of the sensor pixel output circuits 120 includes an IR pass filter 121 and a photodiode 122 that detects light. FIG. 9A illustrates a sensor pixel output circuit 120' including an IR pass filter 121' not adjusted in thickness and a photodiode 122' that outputs electric charge in accordance with the number of photons. In this case, the IR pass filter 121' transmits the entirety of the incident invisible light, and blocks most of the incident visible light but transmits part of the incident visible light, as illustrated in FIG. 9A. Consequently, the visible image 1002a based on the visible light as part of the received light is included in the read document image 1000a of FIG. 2B, as described above, preventing the identification of the invisible image 1001 embedded in the document 1000. In the image reading apparatus 1b of the second embodiment, therefore, the thickness of the IR pass filters 121 (an example of the reduction unit) of the invisible image reading device 12b is increased, as illustrated in FIG. 9B. Thereby, the amount of the visible light transmitted through the IR pass filters 121 is reduced; the visible light received by the invisible image reading device 12b is reduced. Consequently, the read document image 1000b obtained by the invisible image reading device 12b includes the invisible image 1001 alone, as illustrated in the above-described example of FIG. 2C.

FIGS. 10-1A, 10-1B, and 10-1C are a diagram and graphs illustrating an operation of the image reading apparatus 1b of the second embodiment; in which the thickness of the IR pass filters 121 is changed. FIG. 10-2 is a graph illustrating a specific example of the relationship between the thickness of the IR pass filters 121 and the transmittance of the visible light and the invisible light in the image reading apparatus 1b of the second embodiment. FIG. 10-3 is a graph illustrating a specific example of the relationship between the thickness of the IR pass filters 121 and the proportion of the visible wavelength component included in the invisible light in the image reading apparatus 1b of the second embodiment. An operation of the image reading apparatus 1b of the second embodiment will be described with reference to FIGS. 10-1A to 10-1C, FIG. 10-2, and FIG. 10-3.

It is assumed here that the object read by the image reading apparatus 1b is the document 1100 with an embedded character embedded therein as the invisible image, as illustrated in FIG. 10-1A. An invisible image reading device including the above-described sensor pixel output circuit 120' of FIG. 9A has a characteristic of transmitting light in a visible wavelength range of approximately 600 nm to approximately 780 nm, as illustrated in FIG. 10-1B. Therefore, if the document 1100 is irradiated with the visible light and the invisible light without the adjustment of the ratio between the light amount of the visible light source 13a and the light amount of the invisible light source 13b, the read document image 1100a read by the invisible image reading device 12b includes the visible image (the image of cherry blossoms), preventing the identification of the embedded character (the Chinese character meaning "authentic") as the invisible image.

Figure 102:
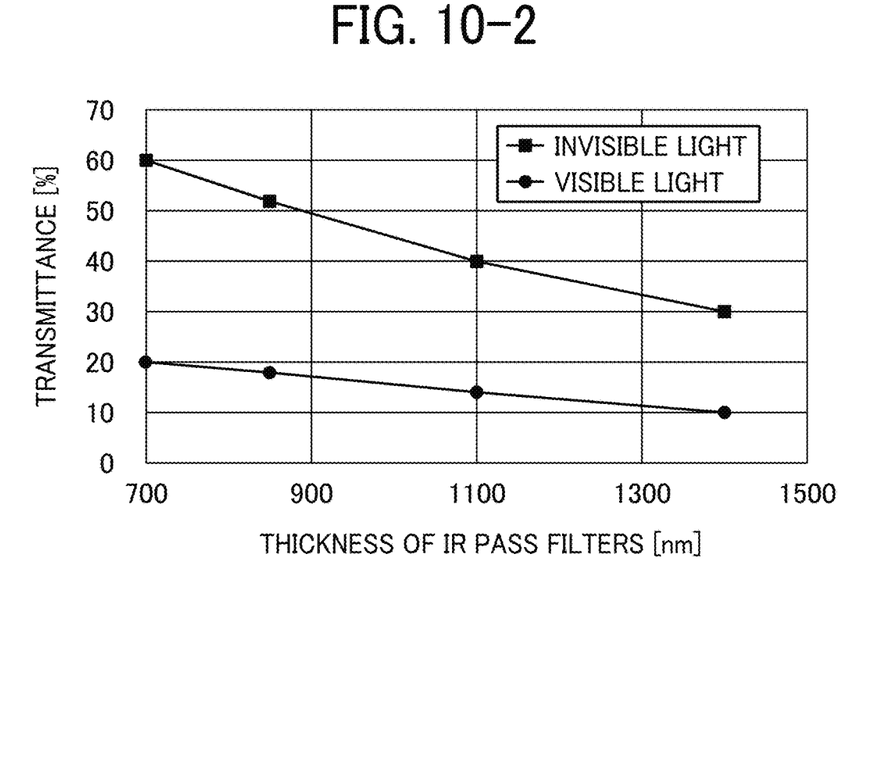

In the image reading apparatus 1b, therefore, the thickness of the IR pass filters 121 of the invisible image reading device 12b is increased. Increasing the thickness of the IR pass filters 121 reduces the transmittance of the invisible light and the visible light. Based on this characteristic, the IR pass filters 121 are adjusted in thickness so as not to transmit the light in the visible wavelength range of approximately 600 nm to approximately 780 nm (i.e., visible light). Thereby, the amount of the transmitted visible wavelength component (i.e., visible light) is reduced; the visible wavelength component included in the read document image is reduced. For example, FIG. 10-2 illustrates changes in the transmittance of the visible light and the invisible light with the change in the thickness of the IR pass filters 121. When the thickness of the IR pass filters 121 is doubled from 700 nm to 1400 nm, the transmittance of the visible light is reduced from approximately 20% to approximately 10%, and the transmittance of the invisible light is reduced from approximately 60% to approximately 30%. Based on this characteristic, the thickness of the IR pass filters 121 is adjusted to a value at which the visible wavelength component included in the read document image is reduced. Thereby, the invisible image reading device 12b reads the read document image 1100b illustrated in FIG. 10-1C, in which the embedded character as the invisible image based on the invisible wavelength component is identifiable.

Figure 103:
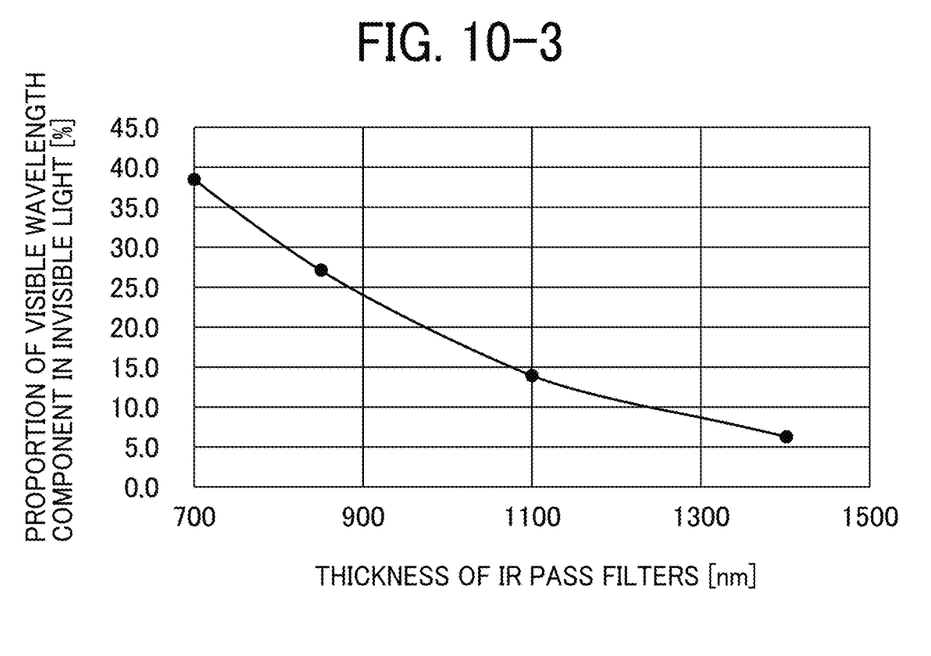

Further, FIG. 10-3 illustrates an example of the relationship between the thickness of the IR pass filters 121 and the proportion of the visible wavelength component included in the invisible light received by the invisible image reading device 12b (hereinafter simply referred to as the proportion of the visible wavelength component). As illustrated in FIG. 10-3, increasing the thickness of the IR pass filters 121 reduces the proportion of the visible wavelength component included in the invisible light received by the invisible image reading device 12b. As described above, increasing the proportion of the visible wavelength component in the invisible light received by the invisible image reading device 12b makes it more difficult to identify the invisible image of the embedded character or the two-dimensional code such as the QR code. Therefore, the proportion of the visible wavelength component is reduced to improve the visibility of the invisible image of the embedded character or the two-dimensional code such as the QR code. For example, reducing the proportion of the visible wavelength component to 50% or less improves the visibility of the invisible image to make the two-dimensional code readable. Further reducing the proportion of the visible wavelength component to 30% or less enhances the robustness in terms of print quality, which is expected to expand the range of compatible decoding software. To reduce the proportion of the visible wavelength component to 30% or less, the thickness of the IR pass filters 121 may be se to 800 nm or greater, for example, as illustrated in FIG. 10-3.

Increasing the thickness of the IR pass filters 121, however, increases the invisible light blocking rate. That is, an excessive increase in the thickness of the IR pass filters 121 results in degraded quality of the invisible image. It is therefore desirable to set the thickness of the IR pass filters 121 to a value at which the quality of the invisible image is maintained.

As described above, in the image reading apparatus 1b of the second embodiment, the visible light source 13a emits the visible light, and the invisible light source 13b emits the invisible light. Further, the visible image reading device 11 reads the visible image of the document, and the invisible image reading device 12b reads the invisible image of the document. The invisible image reading device 12b includes the IR pass filters 121, the thickness of which is adjusted to reduce the visible wavelength component of the light received by the invisible image reading device 12b. In the reading of the invisible image with the invisible light and visible light irradiation, therefore, the influence of the visible wavelength component on the image recognition is reduced.

The function of the control device 14 of the image reading apparatus 1 according to the first embodiment to adjust the light amount of the visible light of the visible light source 13a may be incorporated in the image reading apparatus 1b of the second embodiment. For example, therefore, when the amount of the visible light to be transmitted through the IR pass filters 121 is reduced, the light amount of the visible light of the visible light source 13a may be finely adjusted to be suitable for reading the invisible image.

A Third Embodiment of the Present Invention Will be Described

In the third embodiment, a description will be given of an operation of obtaining the invisible image in which the two-dimensional code (e.g., QR code) is decodable.

Figure 11A:
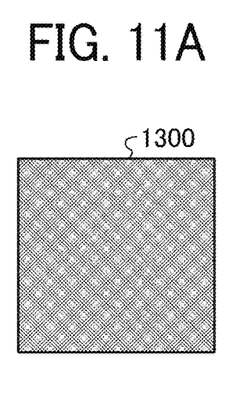
FIGS. 11A, 11B, and 11C are diagrams illustrating an operation of an image reading apparatus according to a third embodiment of the present invention, in which the proportion of the visible wavelength component in the invisible light is set to 50% or less.
Figure 11B:
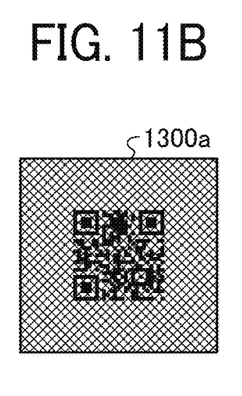
Figure 11C:
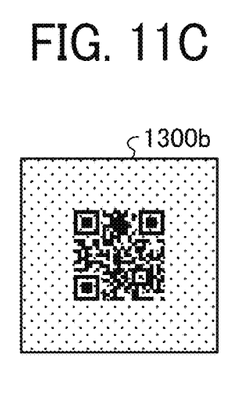

FIGS. 11A, 11B, and 11C are diagrams illustrating an operation of the image reading apparatus 1, 1a, or 1b of the third embodiment, in which the proportion of the visible wavelength component is set to 50% or less. With reference to FIGS. 11A to 11C, a description will be given of the operation of the image reading apparatus 1, 1a, or 1b of the third embodiment to obtain the invisible image in which the two-dimensional code (e.g., QR code) is decodable. The method employed here to reduce the visible light to be received by the invisible image reading device 12 or 12b may be the method of adjusting the light amount of the visible light of the visible light source 13a described in the first embodiment or the method of adjusting the thickness of the IR pass filters 121 described in the second embodiment.

A document 1300 illustrated in FIG. 11A has a QR code embedded therein as an example of the two-dimensional code. A read document image 1300a illustrated in FIG. 11B is the read image (i.e., the invisible image read by the invisible image reading device 12 or 12b) obtained when the proportion of the visible wavelength component included in the invisible image (hereinafter referred to as the visible color mixture ratio) is greater than 50% of the entire invisible image (i.e., the combination of the invisible wavelength component and the visible wavelength component). In this case, the contrast between the QR code and a background portion fails to reach the level enabling the decoding of the QR code due to the visible wavelength component included in the invisible image, which is the QR code.

A read document image 1300b illustrated in FIG. 11C, on the other hand, is the read image (i.e., the invisible image read by the invisible image reading device 12 or 12b) obtained when the proportion of the visible wavelength component included in the invisible image (i.e., the visible color mixture ratio) is equal to or less than 50% of the entire invisible image. In the case of the QR code, when the visible color mixture ratio is equal to or less than 50%, the contrast between the QR code and the background portion reaches the level enabling the decoding of the QR code. The decoding of the QR code involves a binarization process, which typically uses the median as the threshold value. The QR code is decodable when the visible color mixture ratio is 50% or less. In the image reading apparatus 1, 1a, or 1b of the third embodiment, therefore, the visible light to be received by the invisible image reading device 12 or 12b is reduced to attain a visible color mixture ratio of 50% or less.

Consequently, the two-dimensional code (the QR code in the present example) as the invisible image is identifiable in the obtained read image.

In each of the foregoing embodiments, when at least one of the functional units of the image reading apparatus 1, 1a, or 1b is implemented by the execution of a program, the program is provided as previously stored in a storage device such as a read only memory (ROM). Further, in each of the embodiments, the program executed by the image reading apparatus 1, 1a, or 1b may be provided as recorded on a computer readable recording medium, such as a compact disc-ROM (CD-ROM), a flexible disk (FD), a CD-recordable (CD-R), or a digital versatile disc (DVD), in an installable or executable file format. Further, in each of the embodiments, the program executed by the image reading apparatus 1, 1a, or 1b may be stored in a computer connected to a network such as the Internet and be provided as downloaded via the network, or may be provided or distributed via a network such as the Internet. Further, in each of the embodiments, the program executed by the image reading apparatus 1, 1a, or 1b is configured as modules including at least one of the above-described functional units. As an actual hardware configuration, a CPU reads and executes the program from a storage device to load and generate the above-described functional units on a main storage device.

The Present Disclosure Relates to the Following Aspects

According to a first aspect, an image reading apparatus irradiates an object with visible light and invisible light to read an image of the object. The image reading apparatus includes a first light source, a second light source, a visible image reading device, an invisible image reading device, and a reduction unit. The first light source emits the visible light. The second light source emits the invisible light. The visible image reading device reads a visible image of the object. The invisible image reading device reads an invisible image of the object. The reduction unit reduces a visible wavelength component of light received by the invisible image reading device.

According to a second aspect, in the image reading apparatus of the first aspect, the reduction unit is a control device that adjusts a light amount of the visible light of the first light source to reduce the visible wavelength component of the light received by the invisible image reading device.

According to a third aspect, in the image reading apparatus of the first aspect, the image reading device includes filters as the reduction unit. The filters have a thickness adjusted to reduce the visible wavelength component of the light received by the invisible image reading device.

According to a fourth aspect, the image reading apparatus of the first aspect includes a control device as the reduction unit. The control device adjusts a light amount of the visible light of the first light source to reduce the visible wavelength component of the light received by the invisible image reading device. The invisible image reading device includes filters as the reduction unit. The filters have a thickness adjusted to reduce the visible wavelength component of the light received by the invisible image reading device.

According to a fifth aspect, in the image reading apparatus of the second aspect, the control device adjusts the light amount of the visible light of the first light source based on a light amount of the invisible light of the second light source.

According to a sixth aspect, in the image reading apparatus of the fourth aspect, the control device adjusts the light amount of the visible light of the first light source based on a light amount of the invisible light of the second light source.

According to a seventh aspect, in the image reading apparatus of the second aspect, the control device adjusts the light amount of the visible light of the first light source in accordance with an operation performed on an operation device.

According to an eighth aspect, in the image reading apparatus of the fourth aspect, the control device adjusts the light amount of the visible light of the first light source in accordance with an operation performed on an operation device.

According to a ninth aspect, in the image reading apparatus of the second aspect, the control device adjusts the light amount of the visible light of the first light source in accordance with a read image quality mode set via, an operation device.

According to a tenth aspect, in the image reading apparatus of the fourth aspect, the control device adjusts the light amount of the visible light of the first light source in accordance with a read image quality mode set via an operation device.

According to an eleventh aspect, in the image reading apparatus of the ninth aspect, the read image quality mode includes at least a first read image quality mode and a second read image quality mode. The first read image quality mode is for adjusting the light amount of the visible light of the first light source to be suitable for reading a two-dimensional code as the invisible image. The second read image quality mode is for adjusting the light amount of the visible light of the first light source to be suitable for reading an embedded character as the invisible image.

According to a twelfth aspect, in the image reading apparatus of the tenth aspect, the read image quality mode includes at least a first read image quality mode and a second read image quality mode. The first read image quality mode is for adjusting the light amount of the visible light of the first light source to be suitable for reading a two-dimensional code as the invisible image. The second read image quality mode is for adjusting the light amount of the visible light of the first light source to be suitable for reading an embedded character as the invisible image.

According to a thirteenth aspect, in the image reading apparatus of one of the first to twelfth aspects, the reduction unit reduces the visible wavelength component of the light received by the invisible image reading device to adjust a proportion of a visible wavelength component included in the invisible image to equal to or less than 50% of the invisible image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image reading apparatus comprising:
   a first light source configured to irradiate an object with visible light;
   a second light source configured to irradiate the object with invisible light;
   a visible imaging sensor configured to read a visible image of the object;
   an invisible imaging sensor configured to read an invisible image of the object; and
   a reducer configured to reduce a visible wavelength component of light received by the invisible imaging sensor,
   wherein the reducer is a plurality of filters included in the invisible imaging sensor, the plurality of filters having a thickness adjusted to reduce the visible wavelength component of the light received by the invisible imaging sensor.

2. The image reading apparatus of claim 1, wherein the reducer is circuitry configured to adjust a light amount of the visible light of the first light source to reduce the visible wavelength component of the light received by the invisible imaging sensor.

3. The image reading apparatus of claim 2, wherein the reducer adjusts the light amount of the visible light of the first light source based on a light amount of the invisible light of the second light source.

4. The image reading apparatus of claim 2, wherein the reducer adjusts the light amount of the visible light of the first light source in accordance with an operation performed on an operation device.

5. The image reading apparatus of claim 2, wherein the reducer adjusts the light amount of the visible light of the first light source in accordance with a read image quality mode set via an operation device.

6. The image reading apparatus of claim 5, wherein the read image quality mode includes at least
   a first read image quality mode for adjusting the light amount of the visible light of the first light source to be suitable for reading a two-dimensional code as the invisible image, and
   a second read image quality mode for adjusting the light amount of the visible light of the first light source to be suitable for reading an embedded character as the invisible image.

7. The image reading apparatus of claim 1, wherein the reducer reduces the visible wavelength component of the light received by the invisible imaging sensor to adjust a proportion of a visible wavelength component included in the invisible image to equal to or less than 50% of the invisible image.

8. An image reading method comprising:
   irradiating an object with visible light of a first light source;
   irradiating the object with invisible light of a second light source;
   reading a visible image of the object with a visible imaging sensor;
   reading an invisible image of the object with an invisible imaging sensor; and
   adjusting a light amount of the visible light of the first light source to reduce a visible wavelength component of light received with the invisible imaging sensor,
   wherein the adjusting includes adjusting the light amount of the visible light of the first light source in accordance with a read image quality mode set via an operation device, and
   wherein the read image quality mode includes at least:

a first read image quality mode for adjusting the light amount of the visible light of the first light source to be suitable for reading a two-dimensional code as the invisible image, and a second read image quality mode for adjusting the light amount of the visible light of the first light source to be suitable for reading an embedded character as the invisible image.

9. The image reading method of claim 8, wherein the adjusting includes adjusting the light amount of the visible light of the first light source based on a light amount of the invisible light of the second light source.

10. A non-transitory recording medium storing a plurality of instructions which, when executed by one or more processors, causes the processors to perform an image reading method, the image reading method comprising:

irradiating an object with visible light of a first light source;

irradiating the object with invisible light of a second light source;

reading a visible image of the object with a visible imaging sensor;

reading an invisible image of the object with an invisible imaging sensor; and adjusting a light amount of the visible light of the first light source to reduce a visible wavelength component of light received with the invisible imaging sensor, wherein the adjusting includes adjusting the light amount of the visible light of the first light source in accordance with a read image quality mode set via an operation device, and wherein the read image quality mode includes at least:

a first read image quality mode for adjusting the light amount of the visible light of the first light source to be suitable for reading a two-dimensional code as the invisible image, and a second read image quality mode for adjusting the light amount of the visible light of the first light source to be suitable for reading an embedded character as the invisible image.

11. An image reading apparatus comprising:

a first light source configured to irradiate an object with visible light;

a second light source configured to irradiate the object with invisible light;

a visible imaging sensor configured to read a visible image of the object;

an invisible imaging sensor configured to read an invisible image of the object; and a reducer configured to reduce a visible wavelength component of light received by the invisible imaging sensor, wherein the reducer reduces the visible wavelength component of the light received by the invisible imaging sensor to adjust a proportion of a visible wavelength component included in the invisible image to equal to or less than 50% of the invisible image.

\* \* \* \* \*